March 12, 1957 J. G. BOOTH 2,784,601
INDICATING INSTRUMENT
Filed May 24, 1951 2 Sheets-Sheet 1

INVENTOR.
JOHN G. BOOTH
BY
ATTORNEY.

March 12, 1957  J. G. BOOTH  2,784,601
INDICATING INSTRUMENT
Filed May 24, 1951  2 Sheets-Sheet 2
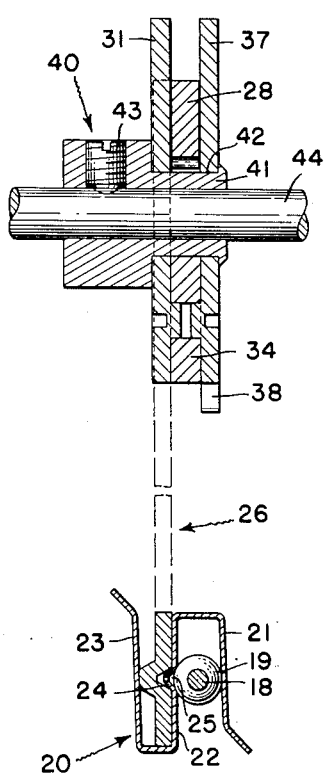
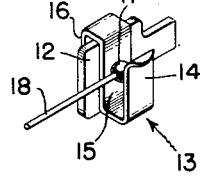
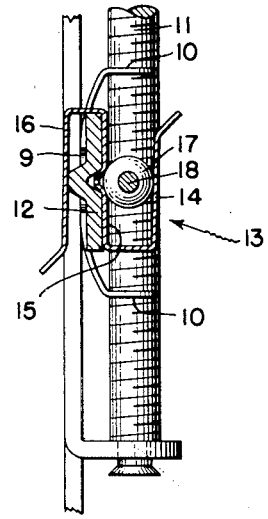
*INVENTOR.*
JOHN G. BOOTH
BY
ATTORNEY

United States Patent Office 2,784,601
Patented Mar. 12, 1957

2,784,601

INDICATING INSTRUMENT

John G. Booth, Fox Chase Manor, Pa., assignor to Minneapolis-Honeywell Regulator Company, Minneapolis, Minn., a corporation of Delaware Application May 24, 1951, Serial No. 227,952

1 Claim. (Cl. 74—96)

This invention relates to indicators and recorders. More specifically, it relates to instruments which have a driving element consisting of a Bourdon tube or spiral, a driven element consisting of an indicating pointer or recording pen, and a linkage therebetween to transmit the motion of the driving element to the driven element. The driving element is responsive to changes in the variable being measured. This variable is usually temperature, pressure, or rate of flow.

It is an object of this invention to provide such a linkage in which there are means for adjusting the length of the various elements of the linkage and thereby adjusting the overall length of the linkage so as to permit both the driving element and the driven element to be located in casings of various size or to be located in different positions in the same casing. In order that the linkage accurately transmit the motion, the connections between the various elements of the linkage must be positive and exactly located. In order to permit the adjustments to be readily made without the use of tools, these connections must be easily attached and detached, preferably simply by hand.

It is a further object of this invention to provide an S-shaped spring clip having in an intermediate portion thereof an indentation adapted to receive in it a ball-shaped portion of the linkage so as to provide a ball and socket joint. This ball and socket joint is aligned with a second ball and socket joint formed by a rounded projection from the spring clip which interfits with a perforation in an element of the linkage so that the pivot formed by these two joints may be quickly and easily made or unmade and yet accurately located.

The various features of novelty which characterize this invention are pointed out with particularity in the claim annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 3 is a substantially vertical cross section on an enlarged scale on line 3—3 of Fig. 2 viewed in the direction of the arrows.

Fig. 4 is a vertical cross section on the same scale as Fig. 3 on line 4—4 of Fig. 2 viewed in the direction of the arrows.

Fig. 5 is a perspective view of the S-shaped clip shown in Fig. 4.

Figure 1:
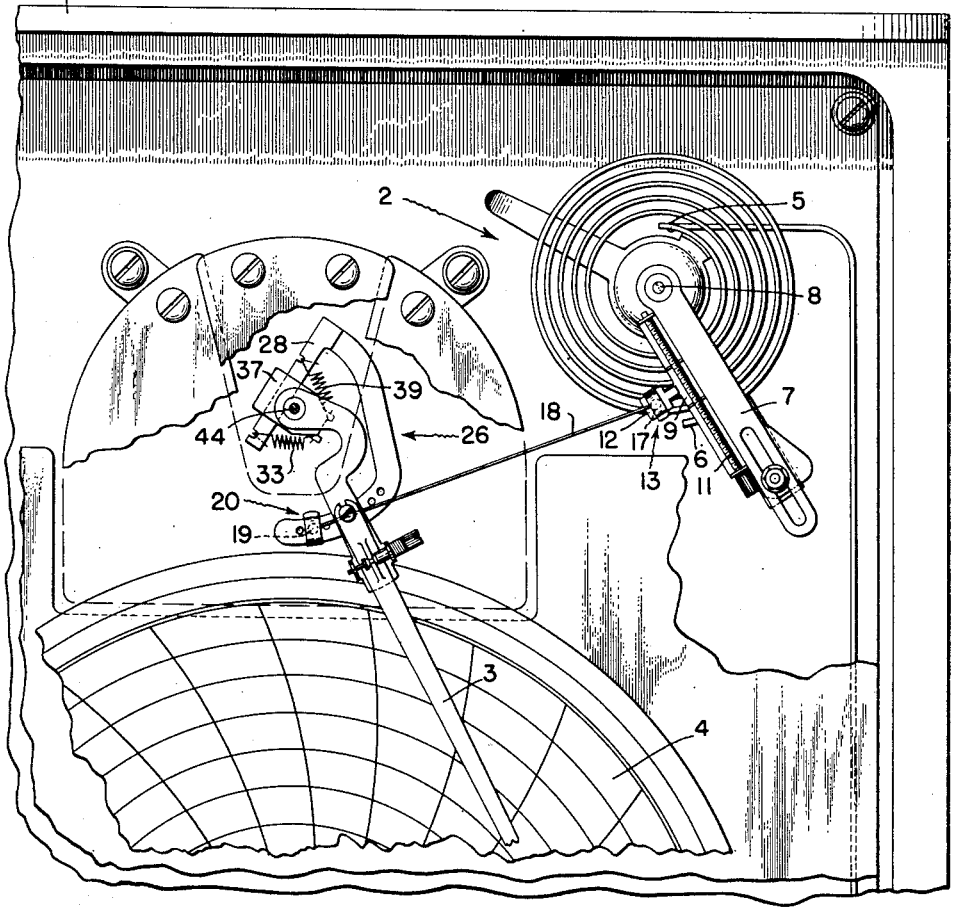
Fig. 1 is a partial front elevation of a meter with the cover of the casing removed.
Figure 2:
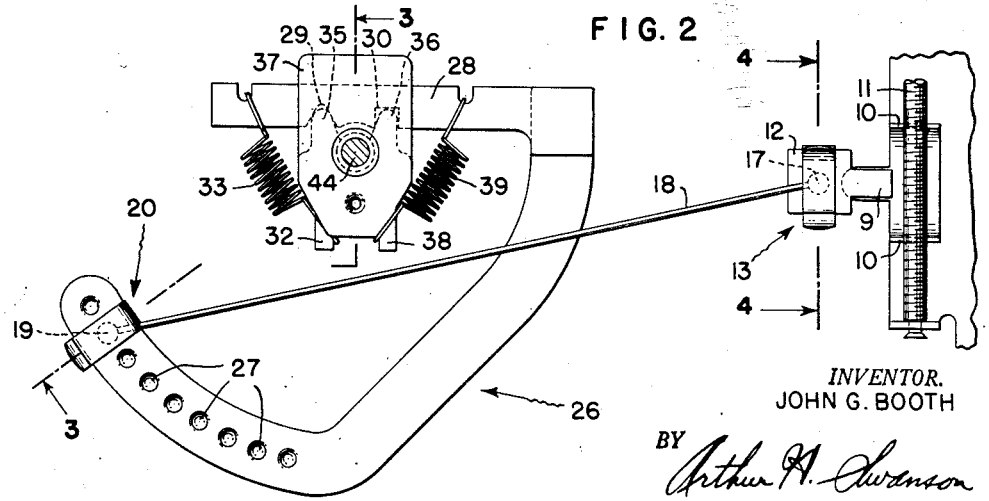
Fig. 2 is a vertical, transverse, cross section on an enlarged scale of a portion of the linkage.

The device of this invention comprises an instrument having a casing 1 usually in the form of a rectangular box having a front door or cover (not shown). In this casing is mounted a driving element (generally indicated at 2) comprising a Bourdon tube or spiral. Driving element 2 drives a linkage to be described more fully hereinafter and also drives a driven element comprising an indicator pointer or recording pen 3 which cooperates with a chart 4 rotated at a uniform speed.

Driving element 2 has its inner end 5 fixed or stationary. The outer end 6 is movable and is attached to a lever 7 which is centrally pivoted about a stationary pivot 8. This central pivot or support constrains the driving element 2 to a single mode of vibration and thus eliminates many undesirable movements not resulting from the variable being measured.

Lever 7 is attached to a substantially T-shaped plate 9 which has a pair of forwardly projecting, notched arms 10 engaging the manually adjustable screw 11. Plate 9 has in its base or vertical arm 12 an indentation in one face and a projection from the other.

Fig. 4 shows an S-shaped clip (generally indicated at 13) having one vertically extending arm 14, an intermediate parallel arm 15, and a third vertically extending parallel arm 16. On the face of the intermediate arm 15 opposite to arm 14 is an indentation or perforation of suitable size and shape to cooperate with a ball 17 formed on one end of a link 18. A projection of suitable size and shape to enter the cavity in the face 12 extends from that face of intermediate arm 15 which is opposite arm 16. Since the perforation and the projection in arm 15 are formed by a single operation, they are aligned and necessarily cause the cavity in arm 12 to be aligned with the ball 17 and thus form an accurately located pivot.

Fig. 3 shows that link 18 has at its opposite end a ball 19.

A second S-shaped spring clip (generally indicated at 20) has a vertical extending arm 21, an intermediate parallel arm 22, and a third parallel arm 23. Projecting from one side of arm 22 is a projection 24. Located in the opposite face of arm 22 is a cavity 25 of suitable size and shape to cooperate with ball 19.

Figs. 1, 2, 3, and 5 show a lever (generally indicated at 26) having a plurality of perforations or cavities 27 in it. Cavities 27 are of suitable size to receive the projections 24 therein. Projection 24 and cavity 25 are aligned. When ball 19 is located in cavity 25, ball 19 is necessarily aligned with the cavity 27 into which the projection 24 is located. The pivot formed by ball 19 and the selected perforation 27 is accurately aligned.

At its opposite end lever 26 has an arm 28 which contains the V-shaped notch 29 and the rectangular notch 30. Cooperating with notches 29 and 30 is a pivot formed of an outer plate 31 having a projection 32 thereon which serves for the connection of one end of a spring 33 secured at its other end to arm 28 of lever 26. The pivot also is made up of a center plate 34 having projections 35 and 36 extending upwardly therefrom so as to be received by notches 29 and 30. The pivot also comprises a third plate 37 having a projection 38 extending downwardly therefrom so as to receive one end of spring 39 secured at its opposite end to arm 28 of lever 26. Plates 31, 34, and 37 are secured together so that they form one unitary element. The side plates 31 and 37 abut the sides of arm 28 and guide it in its rocking motion about the projections 35 and 36 and a bushing (generally indicated at 40). Bushing 40 has a smaller diameter 41 which has a forced fit for engagement with holes 42 in plates 31, 34, and 37 so that the pivot is fast on bushing 40 which is secured by means of pin 43 to index shaft 44. Shaft 44 carries the indicator or recorder hand 3 (Fig. 1).

Operation

The driving element is responsive to changes in the variable being measured. This variable is usually temperature, pressure, or rate of flow. When a change in the variable being measured is felt by Bourdon tube or spiral 2, it causes the free end 6 to rotate and thereby turn lever 7 about its central, stationary pivot 8. Rotation of lever 7 carries T-shaped plate 9 with it so that clip 13 moves link 18 by means of the ball 17 secured in the clip 13. The opposite end of link 18 is attachably secured by means of clip 20 to lever 26 because ball 19 is held between arms 21 and 22 of clip 20 while lever 26 is secured to clip 20 between arms 22 and 23 of clip 20. Relatively slow movement of driving element 2 and consequently of lever 26 causes lever 26 to turn index shaft 44 without extending springs 33 or 39. However, if an excess torque occurs, such as an undesired vibration due to a sudden extraneous motion of driving element 2 or a part of the linkage, lever 26 turns in the direction of the torque and stretches either spring 33 or 39 permitting arm 28 to rock about projection 35 or projection 36 as the case may be. This stretching of springs 33 and 39 permits overtravel of the driving element 2 without corresponding false movement of the indicator or recorder pen 3.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claim, and that in some cases certain features of the invention may sometimes be used to advantage without a corresponding use of other features.

Having now described my invention, what I claim as new and desire to secure by Letters Patent is as follows:

A connection for use in linkage for transmitting movement from the driving element of a gauge responsive to the changes in a variable being measured to the driven element of said gauge which indicates such changes, said connection including, a link having a ball-shaped portion, an S-shaped spring clip having an indentation in and a projection from an intermediate portion thereof, said indentation being adapted to receive and yieldingly retain said ball-shaped portion therein for limited rocking movement, and a lever having driving connection with said driven element and having a plurality of cavities therein of suitable size to receive in one of said cavities the projection on said clip so that the ball-shaped portion of said link is aligned with the cavity in said lever.

References Cited in the file of this patent
UNITED STATES PATENTS

| | | |
|---|---|---|
| 322,479 | Potter | July 21, 1885 |
| 374,702 | Rand | Dec. 13, 1887 |
| 645,518 | Watt | Mar. 13, 1900 |
| 1,958,934 | Williams | May 15, 1939 |
| 2,173,155 | Bertrand | Sept. 19, 1939 |
| 2,235,976 | Best | Mar. 25, 1941 |
| 2,242,021 | Ball | May 13, 1941 |
| 2,278,691 | Cotter | Apr. 7, 1942 |
| 2,490,663 | Van Vum | Dec. 6, 1949 |
| 2,533,626 | Reiter | Dec. 12, 1950 |
| 2,534,569 | Bowditch | Dec. 19, 1950 |
| 2,561,969 | Bowditch | July 24, 1951 |